(12) United States Patent
Nozaki

(10) Patent No.: US 7,580,844 B2
(45) Date of Patent: Aug. 25, 2009

(54) IMAGE DATA STORING SERVICE SYSTEM

(75) Inventor: Iwao Nozaki, Wakayama (JP)

(73) Assignee: Noritsu Koki Co., Ltd., Wakayama (JP)

( * ) Notice: Subject to any disclaimer, the term of this patent is extended or adjusted under 35 U.S.C. 154(b) by 1236 days.

(21) Appl. No.: 10/253,881

(22) Filed: Sep. 25, 2002

(65) Prior Publication Data

US 2003/0065530 A1    Apr. 3, 2003

(30) Foreign Application Priority Data

Sep. 28, 2001   (JP) ............... 2001-300368

(51) Int. Cl.
   *G07C 3/00* (2006.01)
   *G06Q 30/00* (2006.01)
(52) U.S. Cl. .......................... 705/1; 705/26
(58) Field of Classification Search ............ 705/1, 705/26

See application file for complete search history.

(56) References Cited

U.S. PATENT DOCUMENTS

| | | | |
|---|---|---|---|
| 5,231,506 A | 7/1993 | Manico et al. | |
| 5,666,215 A | 9/1997 | Fredlund et al. | |
| 6,429,923 B1 * | 8/2002 | Ueda et al. ............. | 355/40 |
| 6,680,889 B1 * | 1/2004 | Ito et al. ............... | 369/53.2 |
| 2001/0009602 A1 | 7/2001 | Nakayama | |

FOREIGN PATENT DOCUMENTS

| | | |
|---|---|---|
| EP | 0 878 956 A1 | 11/1998 |
| EP | 1 087 607 A2 | 3/2001 |
| EP | 1 128 210 A1 | 8/2001 |
| JP | 06-139453 | 5/1994 |
| JP | 09-190578 | 7/1997 |
| JP | 2000-195226 | 7/2000 |
| JP | 2002-195226 | 7/2000 |
| JP | 2001-045413 | 2/2001 |
| JP | 2001-167357 | 6/2001 |
| JP | 2001-300368 | 4/2005 |

OTHER PUBLICATIONS

Ruby SuperSystem, Nov. 1997, Verifone, Inc.*
Bekman, How Do I Put Photographs onto CDROM, Mar. 31, 1999.*
Put Family Photos On Your PC, Mar. 1997, Family Computing, vol. 8, Issue 3.*
Office Action mailed Nov. 10, 2006, by the European Patent Office for the European Patent Application No. 02021795.6.
European Search Report [3 pages] Feb. 14, 2003.

* cited by examiner

*Primary Examiner*—Naresh Vig
(74) *Attorney, Agent, or Firm*—Nixon & Vanderhye

(57) ABSTRACT

In the present invention, a customer operates a customer-use terminal device 1 so that image information stored in a data career brought by the customer is read out by a media drive 2 or a scanner 4, and then a clerk receives payment for the service by the customer. Subsequently, in the customer-use terminal device 1, a CD-R drive 3 carries out the storing of digital image data corresponding to the image information which has been read, only when the completion of the payment id confirmed. With this arrangement, it is possible to provide an image data storing service system which enables to save labor of clerks, reduce the required introduction cost, and ascertain the collection of the payment.

5 Claims, 7 Drawing Sheets

FIG. 6

| | PIECE RATE | QUANTITY | SUBTOTAL |
|---|---|---|---|

ORDER NUMBER : 009

NUMBER OF PHOTOS : 10    INDEX PRINT: YES

| | PIECE RATE | QUANTITY | SUBTOTAL |
|---|---|---|---|
| BASIC RATE | 500 | 1 | 500 |
| INDEX | 0 | 1 | 0 |
| LARGE SIZE | 50 | 10 | 500 |
| C D − R | 400 | 1 | 400 |
| TOTAL AMOUNT | | | ¥1400 |

BACK                                    SET

FIG. 7

```
              RECEIPT

Noritsu Camera
Tel: 073-123-45678
579-1 Umehara, Wakayama-city
― ― ― ― ― ― ― ― ― ― ― ― ― ―
Date: 2001-02-11 15:30
Order Number: 009
D Photo Printing:              500
Index Print:                     0
Large Size - 10 copies         500
C D - R                        400
― ― ― ― ― ― ― ― ― ― ― ― ― ―
Total Amount                 ¥1400
                       (tax inclusive)
Thank You
```

IMAGE DATA STORING SERVICE SYSTEM

FIELD OF THE INVENTION

The present invention relates to an image data storing service system used in shops providing a service of storing image data, which is stored in a data carrier brought by a customer, in a predetermined type of a storing medium as digital image data.

BACKGROUND OF THE INVENTION

There have conventionally been shops providing a photo print service. In these shops, an automatic printer, by which images recorded in a film are printed on photoic papers so that photos are developed through the processing, is provided, and by using the automatic printer, the shops develop photos from exposed films brought by a customer. Also, due to popularization of digital cameras, there has recently been a service of printing photos from images which are taken using a digital camera, by means of an automatic printer corresponding to digital printing.

Moreover, popularization of personal computers has created demand of storing taken images as digital data. For instance, generally digital cameras store images in flash memories such as a flash EEPROM. However, since the flash memories are relatively expensive, there has been a demand of transferring image data in the flash memories to other less expensive storing media.

One of the most popular and inexpensive storing media is floppy discs, however, the capacity thereof is small. Since the performance of digital cameras has been improved, the amount of data per one image has been increased so that floppy discs are not suitable for storing such a large amount of image data.

One of the media which is capable of storing relatively large amount of data and has versatility is CD-R discs. CD-R discs, which can be read by CD-ROM drives attached to popularly used personal computers, are capable of storing relatively large 650-700 MB of data, and the price thereof is low. On this account, CD-R discs are suitable as a storing medium for storing a large amount of image data.

However, CD-R drives by which data is stored in CD-R discs have not been in common use, in spite of the growing popularity. For this reason, the shops doing the service of printing images also provide the service of CD-R writing.

This service is arranged as follows: When a customer brings in a flash memory in which images taken by a digital camera are stored, the stored image data is written in a CD-R disc. When the customer brings in a negative on which images taken using a conventional camera are printed, the images printed on the negative are converted to digital image data by means of scanning, and this digital image data is written in a CD-R disc.

As described above, in a shop doing the service of printing images as well as the service of CD-R writing, clerks carry out both the process of printing photos and the process of CD-R writing. In the case of the process of CD-R writing, it is easy to construct, for instance, a system in which a personal computer connected to a CD-R drive and the process is carried out following instructions displayed on the screen. In other words, when this system is provided in the shop and customers can freely use the same, the CD-R writing process can be carried out by the customers themselves with no involvement by the clerks.

However, when the CD-R writing process is carried out on the customer's part, the way of collecting the fee thereof becomes problematic. For instance, although the collection is certainly carried out when a device for collection is attached to the system of the CD-R writing process, this arrangement requires extra expenditure to attach the device for collection.

SUMMARY OF THE INVENTION

The present invention is done to solve the aforementioned problems, so that the objective of the present invention is to provide an image data storing service system which enables to save labor of clerks, reduce the required introduction cost, and ascertain the collection of the fee.

To achieve this objective, the image data storing service system in accordance with the present invention, used in a shop providing a service of storing image information, which is stored in a data carrier brought by a customer, in a predetermined type of a storing medium as digital image data, is characterized by including: a customer-use terminal device which is operated by a customer; an image information reading device which is connected to the customer-use terminal device and reads out the image information stored in the data carrier brought by the customer; and an image data storing device which is connected to the customer-use terminal device and stores digital image data in the predetermined storing medium, wherein the customer-use terminal device is operated by the customer so as to subject the image information reading device to read out the image information, and the customer-use terminal device subjects the image data storing device to store the digital image data only when a completion of payment by the customer is confirmed.

According to this system, first, the customer operates the customer-use terminal device so that the image information reading device reads out the image information stored in the data career which is brought by the customer, and then a clerk receives the payment for the service from the customer. After the completion of the payment is confirmed in the customer-use terminal device, the storing of the digital image data in the storing medium by the image data storing device is permitted. In this system, the reading of the image information stored in the data career and the storing of the digital image data in the storing medium are carried out through the operation of the customer-use terminal device by the customer so that the clerks are only involved with the payment. On this account, the shop can significantly save labor, compared with the system in which the clerks carry out the reading of the image information and the storing of the digital image data, so that the labor cost of the shop can be reduced and the service can be provided at low prices.

Moreover, since the money accounting process is carried out by the clerks, it is unnecessary to attach an accounting device to the customer-use terminal device, and hence the customer-use terminal device can be constructed out of a commonly-used personal computer and peripheral equipments thereof. Thus, the customer-use terminal device can be employed with low cost and hence the shop can introduce the image data storing service system without difficulty.

Furthermore, since the customer-use terminal device permits the storing of the digital image data only when the confirmation of the completion of the payment, it is possible to prevent the storing of the digital image data without carrying out the payment. In other words, with the arrangement above, it is possible to provide the image data storing service system which enables to save labor of clerks, reduce the required introduction cost, and ascertain the collection of the payment for the service of storing digital image data.

BRIEF DESCRIPTION OF THE DRAWINGS

FIG. 6 is an explanatory view, indicating an example of an input information display screen.

FIG. 7 is an explanatory view, illustrating a receipt printed by a second receipt printer.

DESCRIPTION OF THE EMBODIMENTS

The following description will discuss an embodiment in accordance with the present invention in reference to FIGS. 1 through 7.

Figure 1:
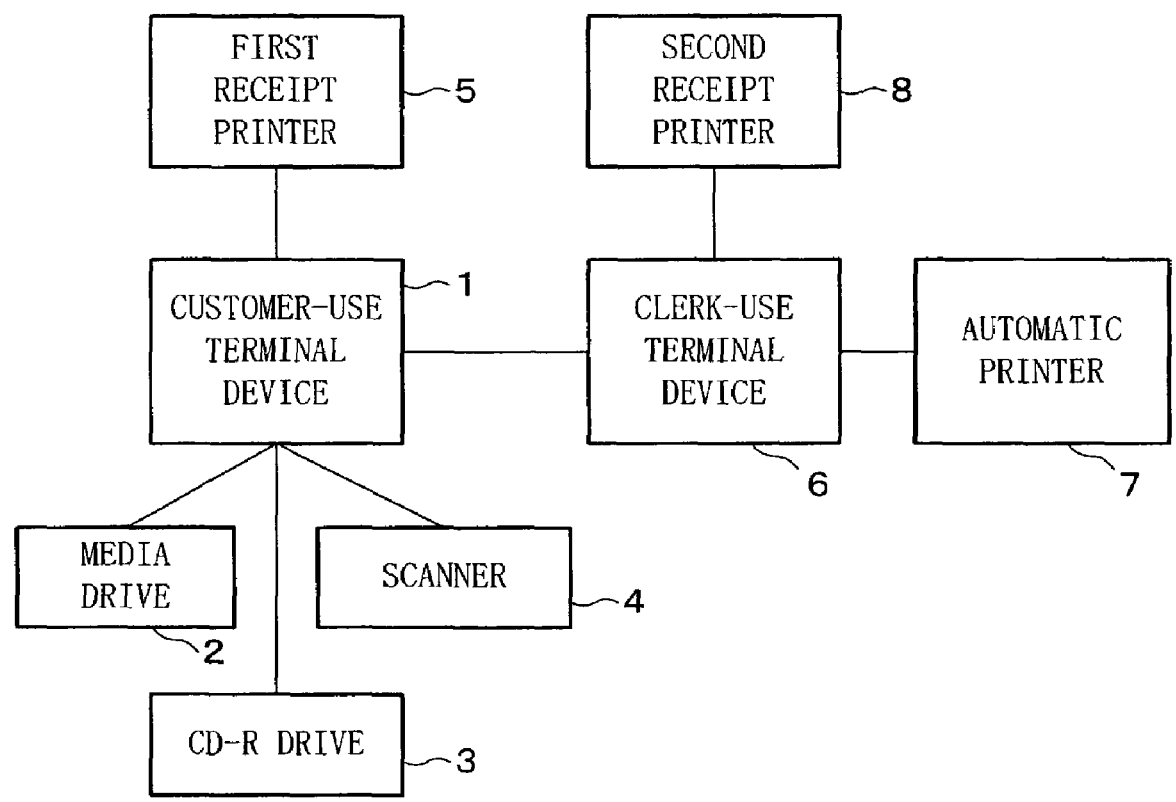
FIG. 1 is a block diagram, illustrating a schematic arrangement of a photo service system in accordance with an embodiment of the present invention.

In this embodiment, a photo service system, used in shops carrying out a photo print service and a CD-R writing service, is described. FIG. 1 is a block diagram illustrating a block diagram of the photo service system in accordance with the present invention. As the figure shows, the photo service system is provided with: a customer-use terminal device 1; a media drive (image information reading device) 2; a CD-R drive (image data storing drive) 3; a scanner (image information reading device) 4; a first receipt printer 5; a clerk-use terminal device 6; an automatic printer (image output device) 7; and a second receipt printer 8.

The customer-use terminal device 1 provided in the shop is freely operated by customers. The customers select services and place orders through the operation of the customer-use terminal device 1. Although only one customer-use terminal device 1 is illustrated in the figure, the system can be provided with a plurality of terminal devices 1.

The media drive 2 is a drive for reading data stored in data carriers such as a flash memory in which images taken by a digital camera is stored, a floppy disc, an MO disc, and a ZIP disc. The CD-R drive 3 is a drive for carrying out a process of writing data in a CD-R disc, when the customer places an order of the CD-R writing service. The scanner 4 scans printed photo images which have been subjected to printing and developing processes, so as to convert the photo images into image data. The first receipt printer 5 prints the customer's order on a receipt.

The media drive 2, the CD-R drive 3, and the scanner 4 are connected to the customer-use terminal device 1 via, for instance, a SCSI (Small Computer System Interface) cable. Also, the first receipt printer 5 is connected to the customer-use terminal device 1 via, for instance, a RS232C cable.

The clerk-use terminal device 6 is a terminal device provided in the shop, and only clerks can operate the terminal 6. This clerk-use terminal device 6 is used for managing the customer-use terminal devices 1 in the shop, various types of information processing, and transmission of image data to the automatic printer 7, etc. The clerk-use terminal device 6 is connected to the customer-use terminal devices 1 using a LAN interface such as Ethernet (registered trademark).

The automatic printer 7 is a photo processing device which can sequentially carry out the exposure, development and drying of photoic papers under united command. This automatic printer 7 is a hybrid-type automatic printer which can carry out both analog exposure in which light is irradiated on films such as a negative and digital exposure in which exposure is carried out in accordance with digital image data. Putative examples of digital exposure engines are such as a PLZT, a laser light source, an LCS (Liquid Crystal Shatter), and a DMD (Digital Micromirror Device).

Incidentally, although the automatic printer 7 in this embodiment is hybrid type, the present invention is not limited to this arrangement so that the automatic printer 7 may be a digital automatic printer only capable of carrying out the digital exposure, when an analog automatic printer which is only capable of carrying out the analog exposure is additionally provided. The second receipt printer 8 prints out a receipt which indicates that the payment for the ordered service has been made by the customer.

The automatic printer 7 is connected to the clerk-use terminal device 6 via, for instance, a SCSI cable. The second receipt printer 8 is connected to the clerk-use terminal device 6 via, for instance, a RS232C cable.

Although not illustrated, the clerk-use terminal device 6 may be connected to a media drive, a CD-R drive, a scanner, etc., as in the case of the customer-use terminal device 1. In this arrangement, a process similar to the process carried out using the customer-use terminal device 1 can be carried out using the clerk-use terminal device 6, and this makes it possible to deal with a case such that a customer who is not good at the operation of the terminal device asks a clerk to carry out the operation.

Figure 2:
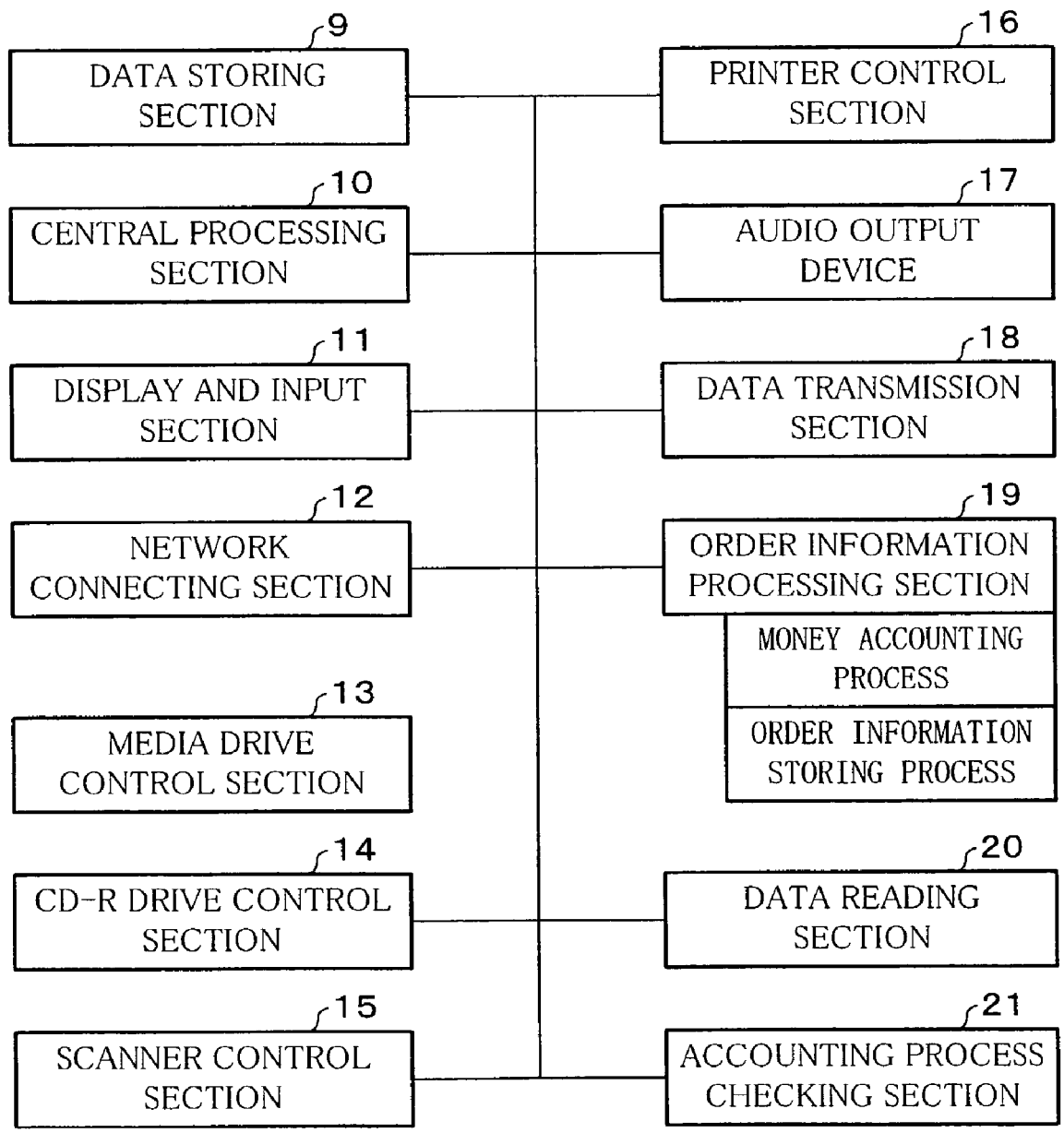
FIG. 2 is a block diagram, illustrating a schematic arrangement of a customer-use terminal device provided in the photo service system.

Now, the arrangement of the customer-use terminal device 1 is described below. FIG. 2 is a block diagram indicating a schematic arrangement of the customer-use terminal device 1. By the way, the arrangement illustrated in FIG. 2 is an example when the customer-use terminal device 1 is arranged using a personal computer. As the figure shows, the customer-use terminal device 1 is provided with: a data storing section (storing means) 9; a central processing section 10; a display and input section 11; a network connecting section 12; a media drive control section 13; a CD-R drive control section 14; a scanner control section 15; a printer control section 16; an audio output device 17; a data transmission section 18; an order information processing section 19; a data reading section 20; and an accounting process checking section 21. Here, although FIG. 2 illustrates that the members above are connected in an identical manner, in reality, some members which are hard-wired via buses and interfaces are mixed with other members which are soft-wired by means of the coordination under control/processing programs.

The data storing section 9, composed of, for instance, storing means such as a hard disc device, is used for storing data read from the media drive 2, image data read by the scanner 4, and various types of control data in the customer-use terminal device 1. Incidentally, in this hard disc device or in another hard disc device, an OS and various kinds of programs and data which are necessary for the operation of the customer-use terminal device 1 are stored.

The central processing section 10, which is composed of a processor such as a CPU (Central Processing Unit), is provided for carrying out various types of processing performed in the customer-use terminal device 1. Although not illustrated, a RAM (Random Access Memory) required as a work space for the various types of processing is also provided therein.

The display and input section 11 is composed of a display monitor such as a touch panel CRT (Cathode Ray Tube). Watching the information displayed on this display and input section 11, the customer performs the input operation through the touch panel, so that the placement of desired orders, etc. is carried out. The display and input section 11 may be composed of a monitor as a display section and a pointing device as an input section or a keyboard as an input device.

The network connecting section 12 is a block performing as an interface of connecting the customer-use terminal device 1 to a communications network. In the present embodiment, since the customer-use terminal device 1 is LAN connected to the clerk-use terminal device 6 via Ethernet, the network connecting section 12 is composed of a LAN card, etc.

The audio output device 17, composed of an amplifier section and a loudspeaker, etc., is a block for outputting various types of sound. For instance, when the customer places orders using the customer-use terminal device 1, the audio output device 17 outputs a voice of operating instructions and background music.

The aforementioned members, namely the data storing section 9, the central processing section 10, the display and input section 11, the network connecting section 12, and the audio output device 17 are hard-wired blocks of the customer-use terminal device 1. In contrast, members described below, namely the media drive control section 13, the CD-R drive control section 14, the scanner control section 15, the printer control section 16, the data transmission section 18, the order information processing section 19, the data reading section 20, and the accounting process checking section 21 are soft-wired blocks of the customer-use terminal device 1.

The media drive control section 13 is a block for controlling the operation of the media drive 2 which is connected to the customer-use terminal device 1, realized by a driver program, etc. The CD-R drive control section 14 is a block for controlling the operation of the CD-R drive 3 which is connected to the customer-use terminal device 1, realized by a driver program, a CD-R writing program, etc. The scanning control section 15 is a block for controlling the scanner 4 which is connected to the customer-use terminal device 1, realized by a driver program, a scanning control program, etc. The printer control section 16 is a block for controlling the first receipt printer 5 which is connected to the customer-use terminal device 1, realized by a driver program, etc.

The data transmission section 18 is a block for the control on the occasion when various types of data such as image data and order information are supplied from the customer-use terminal device 1 to the clerk-use terminal device 6. The order information processing section 19 is a block for carrying out a money accounting process and an order information storing process. The money accounting process is a process of figuring out monetary information related to the order from the customer, and the order information storing process is a block for carrying out a process of storing the order information supplied from the customer onto the data storing section 9.

The data reading section 20 is a block for controlling processes associated with data reading such as a process of reading image data from a medium inserted into the media drive 2 and a process of scanning image data using the scanner 4.

The accounting process checking section 21 is a block for checking whether or not the customer has paid for the order. Only after the accounting process checking section 21 confirms the payment, the CD-R writing process is carried out. The way of checking whether or not the payment has been done is described later.

Figure 3:
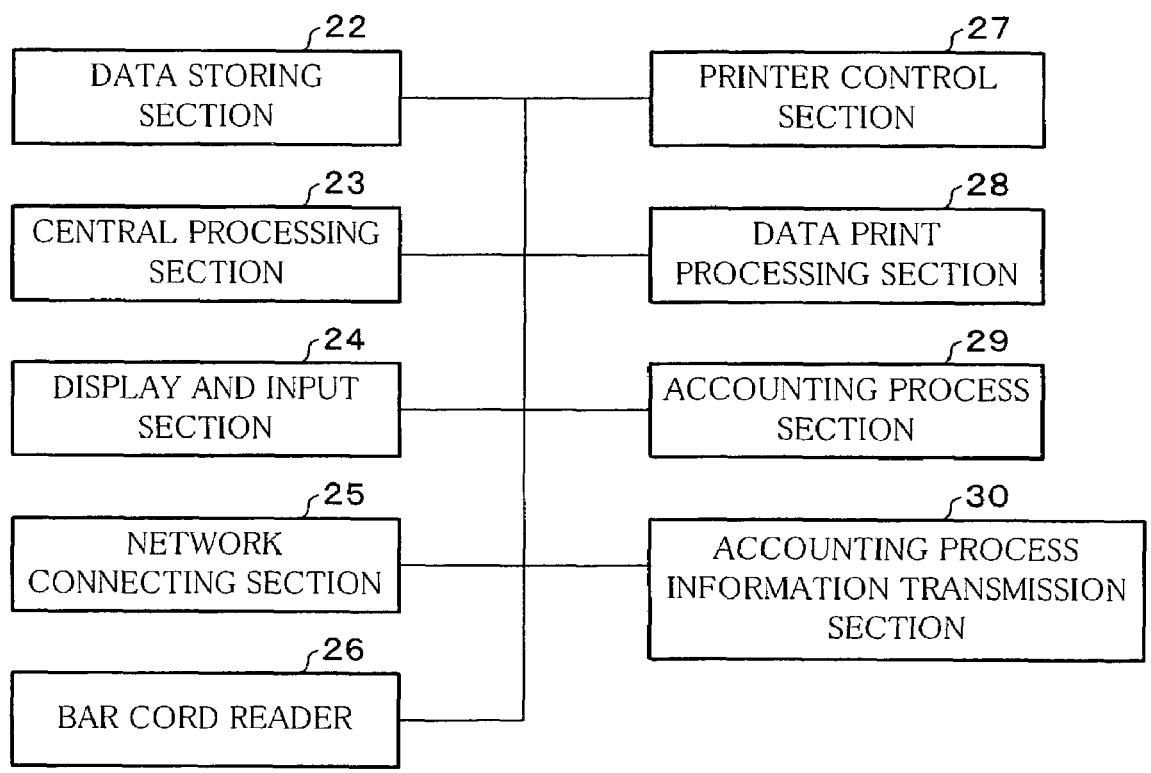
FIG. 3 is a block diagram, illustrating a schematic arrangement of a clerk-use terminal device provided in the photo service system.

Next, the following description will discuss the arrangement of the clerk-use terminal device (shop-use terminal device) 6. Incidentally, the arrangement illustrated in FIG. 3 exemplifies a clerk-use terminal device 6 constructed using a personal computer. As the figure shows, the clerk-use terminal device 6 includes a data storing section (second storing means) 22, a central processing section 23, a display and input section 24, a network connecting section 25, a bar code reader 26, a printer control section 27, a data print processing section 28, an accounting process section 29, and an accounting process information transmission section 30. Here, although FIG. 3 illustrates that the members above are connected in an identical manner, in reality, some members which are hard-wired via buses and interfaces are mixed with other members which are soft-wired by means of the coordination under control/processing programs.

The data storing section 22, which is, for instance, composed of storing means such as a hard disc drive, stores image data supplied from the customer-use terminal device 1, data of the order information, various types of control data in the customer-use terminal device 1, etc. Incidentally, in this hard disc device or in another hard disc device, an OS and various kinds of programs and data which are necessary for the operation of the customer-use terminal device 1 are stored.

The central processing section 23, which is composed of a processor such as a CPU, is provided for carrying out various types of processing performed in the customer-use terminal device 6. Although not illustrated, a RAM (Random Access Memory) required as a work space for the various types of processing is also provided therein.

The display and input section 24 is composed of a display monitor such as a touch panel CRT. Watching the information displayed on this display and input section 24, the clerk performs the input operation through the touch panel, so that various types of processing are carried out. The display and input section 24 may be composed of a monitor as a display section and a pointing device as an input section or a keyboard as an input device.

The network connecting section 25 is a block performing as an interface of connecting the clerk-use terminal device 6 to a communications network. In the present embodiment, since the clerk-use terminal device 6 is LAN connected to the customer-use terminal device 1 via Ethernet, the network connecting section 25 is composed of a LAN card, etc.

The bar code reader 26 is for reading a bar code which indicates a terminal ID and an order number and is printed on a receipt outputted from the first receipt printer 5 provided in the customer-use terminal device 1.

The aforementioned members, namely the data storing section 22, the central processing section 23, the display and input section 24, the network connecting section 25, and the bar code reader 26 are hard-wired blocks of the clerk-use terminal device 6. In contrast, members described below, namely the printer control section 27, the data print processing section 28, the accounting process section 29, and the accounting process information transmission section 30 are soft-wired blocks of the clerk-use terminal device 6.

The printer control section 27 is a block for controlling the operation of the second receipt printer 8 which is connected to the clerk-use terminal device 6, and realized by a driver program, etc.

The data print processing section 28 is a block for supplying image data to the automatic printer 7 and controlling the printing, when the customer places the order of outputting from the automatic printer 7.

The accounting process section 29 is a block for carrying out the accounting process on the occasion of receiving the payment for the order from the customer. The accounting process information transmission section 30 is a block for transmitting the information indicating the completion of the payment to the customer-use terminal device 1.

Now, referring to a flow chart illustrated in FIG. 4, a flow of steps of the photo service system are described below. First, a customer comes to the shop and instructs the commencement of order selection through a main menu displayed on the display screen of the display and input section 11 of the customer-use terminal device 1 (step 1, hereinafter "step" will be referred to as "S").

After the commencement of the order selection, a media selection screen is displayed on the display screen. On the media selection screen, there are select buttons corresponding to the types of media in which image data or images to be subjected to the process of photo printing or the process of CD-R writing are stored. For instance, select buttons corresponding to a flash memory used in digital cameras, FD (Floppy Disc), CD-R, and scanner are displayed on the media selection screen. The customer touches a select button corresponding to the medium that he/she has brought in (S2).

When the type of medium is selected, an instruction to prompt the customer to set the selected medium is displayed on the display screen. When the customer brings in an image data carrier such as a flash memory, an FD, and a CD-R disc, the medium is inserted into the media drive 2 which corresponds to the medium. In contrast, when the customer brings in a photo, the same is placed on the scanner 4 (S3).

After the completion of setting the medium, the media drive control section 13 or the scanner control section 15 starts to read image data from the medium, under the control of the data reading section 20 of the customer-use terminal device 1, and the image data which has been read is stored in the data storing section 9. Then the image data which has been read is displayed on the display screen, as a list of miniaturized images (S4).

The displayed images are accompanied with columns for inputting the number of photos and columns for selecting whether or not the CD-R writing process is carried out, so that the customer specifies how many photos (zero when unnecessary) are developed from the image data and selects the images which are subjected to the CD-R writing process.

Next, on the display screen, a service selection screen, through which the type of services to be carried out is selected, is displayed. What are displayed on this service selection screen are such as the selection of settings related to the photo printing process, the selection of the necessity of an index print, and the selection of the necessity of the CD-R writing process. The settings related to the photo printing process are, for instance, such as the size of photos to be printed, the color correction, the selection of color output, black and white output, or sepia output, and the number of images (1 frame, 2 frames, 4 frames, etc.) to be printed on one photo. The customer selects and arranges the services that he/she desires, using the service selection screen (S5).

After the completion of setting and selecting the services, the order information processing section 19 carries out the calculation of the fee in accordance with the order, so that input information as the information of the order is displayed on the display screen (S6). FIG. 6 shows an example of this input information display screen. As the figure illustrates, the order number, the number of photos, the necessity of the index print, and the fee and specifications of the order are displayed on the input information display screen.

As the specifications of the order, a piece rate, quantity, and subtotal are specified in each of the items such as basic rate, index print, size of the photo, and CD-R. The settings of the specifications are as follows: (i) The basic rate corresponds to the type of the selected medium, and (ii) the number of the basic rate in one order is always one. (iii) The piece rates of the index print and the photo correspond to the size of the same, and (iv) the CD-R has a single piece rate. Incidentally, these settings (i)-(iv) of the order are merely an example so that the settings of the order may be arranged differently.

The customer checks the specifications of the order displayed on the input information display screen illustrated in FIG. 6, and pushes "set" button when the order is satisfactory, or pushes "back" button so as to return to the previous display screen for making alteration of the order. When the order is fixed, the order information is stored in the data storing section 9 by the order information processing section 19, and the printer control section 16 makes the first receipt printer 5 print out an order receipt on which the content of the display screen of FIG. 6 is illustrated (S7). On this order receipt, a terminal ID of the customer-use terminal device 1 from which the order was placed and a bar code indicating the order number are also printed.

Then the customer moves to a counter and receives hands in the order receipt, which has been printed out, to the clerk at the counter. After receiving the order receipt, the clerk scans the printed bar code using the bar code reader 26 of the clerk-use terminal device 6. That is to say, when the clerk receives the order receipt from the customer, the clerk allows the clerk-use terminal device 6 to read the bar code printed on the order receipt, using the bar code reader 26 of the clerk-use terminal device 6. Consequently, the clerk-use terminal device 6 specifies the customer-use terminal device 1 from which the order was placed, and from this specified customer-use terminal device 1, the clerk-use terminal device 6 receives the specifications of the order corresponding to the order number. Then the clerk receives the payment corresponding to the order from the customer, and the accounting process section 29 of the clerk-use terminal device 6 completes the process of the payment (S8).

Here, although the example above is arranged such that the bar code is printed on the order receipt and the specifications of the order are transmitted from the customer-use terminal device 1 to the clerk-use terminal device 6 by scanning the bar code, there are alternative methods which do not require the bar code, such as a system arranged such that the clerk inputs the specifications of the received order receipt into a cash register.

After the completion of the payment, the clerk-use terminal 6 sends the instruction of outputting a receipt, which indicates the completion of the payment, to the second receipt printer 8 via the printer control section 27, so that the second receipt printer 8 prints out the receipt. FIG. 7 shows an example of the receipt. The customer who has received this receipt moves to a CD-R receiving counter, and receives the CD-R disc in return for the presentation of the receipt (S9). The customer may receive the CD-R disc at the time of the payment.

When the process of photo printing is ordered, the corresponding image data is read from the customer-use terminal device 1 so as to be sent to the automatic printer 7. Concurrently, the information of the required number of photos developed from the image data is also sent to the automatic printer 7. Then the automatic printer 7 starts the processes of printing, developing and drying, in accordance with the received image data and the information of the number of photos.

In the meantime, with the CD-R disc supplied from the clerk, the customer moves to the customer-use terminal device 1 where the customer placed the order, and inputs the instruction of carrying out the CD-R writing process. Then after the message suggesting the setting of the CD-R disc is displayed on the display screen, the customer inserts the CD-R disc into the CD-R drive 3 (S10). The CD-R disc which has been set is read (S11), so that whether or not the CD-R disc has already been subjected to the payment (prepaid CD-R disc) is checked (S12). The prepaid CD-R disc is specifically described later.

After the confirmation that the CD-R disc has already been subjected to the payment, the customer inputs the order number to the customer-use terminal device 1, so as to specify the order of his/her own stored in the data storing section 9. Then after the confirmation of the specifications of the order, the CD-R writing process starts (S13). When the CD-R writing process finishes (S14), the initial main menu is displayed on the display screen (S15).

The customer moves to the counter with the clerk and receives the CD-R disc which has been subjected to the writing process, and if the photo printing has also been ordered, from the clerk at the counter, the customer receives the photos which are outputted from the automatic printer 7 (S16). Now the customer has received all of the ordered items (S17), so that the steps of the photo service system have been completed.

Now, the aforementioned prepaid CD-R disc is specifically described. This prepaid CD-R disc indicates a CD-R disc supplied from the shop to the customer who has completed the payment. When a normal blank CD-R disc which is commercially available is used as the prepaid CD-R disc, the following problem is caused. That is to say, for instance, when the customer wants the service of the CD-R writing process, using a blank CD-R disc bought by the customer him/herself, it is possible to carry out the CD-R writing process by the customer-use terminal device 1 without the payment. On this account, it is necessary to distinguish the prepaid CD-R discs which are supplied from the shop from normal blank CD-R discs. The following description is about an example of a method of giving security to the CD-R discs.

To the prepaid CD-R disc supplied from the shop, security information which indicates that the disc is a prepaid CD-R disc issued by the shop is stored as a first track, using a track-at-once storing method. Then at the time of carrying out the CD-R writing process in the customer-use terminal device 1, primarily the information stored in the CD-R disc being set is read, and the writing process is carried out only when the existence of the security information is confirmed and no information is stored in tracks after the first track. On this account, it is possible to prevent the use of a normal blank CD-R disc for the CD-R writing process.

The security information is, for instance, arranged as follows. In the first track of the CD-R disc, an encrypted serial code (10-digit half size alphanumeric characters) which is inherent in each of the CD-R discs is stored. The first 4 digits of this serial code are a shop code, whereas remaining 6 digits are a serial number. For instance, a shop code Aa01 is allocated to a shop A, and serial numbers from 000000 to 999999 are allocated to CD-R discs of the shop A.

In every working day, the serial code of the CD-R disc which is to be given first is checked at the beginning of the business, and when, for instance, the serial number is 000423, the clerk-use terminal device 6 and the customer-use terminal device 1 are activated so that the serial number (000423) of the CD-R disc to be given first is inputted to the terminal devices from an initial input screen. Provided that the shop A sells 200 CD-R discs in a day on the average, it is assumed that the CD-R discs with the serial numbers of 000423 through 000622 are sold in the day. So including a safety margin, the setting such that only the CD-R discs with the serial numbers from 000423 to 0001422 can be treated in the day is transmitted to each of the customer-use terminal devices 1 in the shop A.

With this arrangement, when a rogue customer copies the content of the CD-R disc bought from the shop to a normal blank CD-R disc and tries to carry out the writing process with respect to the falsified CD-R disc using the customer-use terminal device 1, the serial number thereof is rarely valid. Moreover, since the serial code is encrypted, it is almost impossible to change the serial code and produce a falsified disc. Thus, it is possible to prevent the above-mentioned misuse of the CD-R writing process.

Furthermore, the security information may be alternatively arranged such that a common code which is shared between all of the CD-R discs, such as a combination of a shop code Aa01 and a password 023F, is encrypted so as to be stored in a first track of the CD-R discs, and a design peculiar to the shop is printed on the surface of each CD-R disc. In this case, since all of the CD-R discs share the common code, the serial numbers cannot be effectively used for the aforementioned prevention of the misuse. However, thanks to the unique design printed on the surface of the CD-R disc, it is difficult to use a falsified CD-R disc in the shop.

This example provides an advantage such that all of the CD-R discs in the shop are identical with each other so that the process of preparing a large number of CD-R discs is simplified. Moreover, it is possible to shorten the validated period of the CD-R discs by, for instance, regularly changing the password by a lot unit, and hence the use of the falsified CD-R discs can be prevented.

Incidentally, in CD-R writing services, generally a viewer program is additionally written in the CD-R disc. Thus, a viewer program may be concurrently written in the CD-R disc at the time of writing in the security information as above.

Next, referring to a flow chart in FIG. 5, another example of a flow of steps of the photo service system in accordance with the present invention is described as below. In this flow chart, steps from S21 to S28 and steps from S34 to S38 are identical with the steps from S1 to S8 and the steps from S13 to S17 in the flow chart of FIG. 4, respectively. On this account, the descriptions of the steps above are omitted.

The customer presents the order receipt which has been printed out to the clerk in the step 27, so that the bar code printed on the receipt is read by the bar code reader 26 of the clerk-use terminal device 6. That is to say, after receiving the order receipt from the customer, the clerk scans the printed bar code using the bar code reader 26 of the clerk-use terminal device 6 so that the clerk-use terminal device 6 reads the order receipt. Through this process, the customer-use terminal device 1 from which the order was placed is specified so that the specifications of the order corresponding to the order number is sent to the clerk-use terminal device 6. Then the clerk receives the payment corresponding to the order from the customer, so that the accounting process section 29 of the clerk-use terminal device 6 completes the process of the payment (S28).

After the completion of the payment, the clerk-use terminal 6 sends the instruction of outputting a receipt, which indicates the completion of the payment, to the second receipt printer 8 via the printer control section 27, so that the second receipt printer 8 prints out the receipt and the receipt is given to the customer (S29).

Also, the clerk-use terminal device 6 sends the order number, which corresponds to the already-paid order, to the customer-use terminal device 1 from which the order was placed, by means of the accounting process information transmission section 30. Receiving the order number corresponding to the already-paid order, the customer-use terminal device 1 stores the data, which indicates the completion of the payment, in a corresponding set of the order information among sets of the order information stored in the data storing section 9 (S30).

When the photo printing has concurrently been ordered, corresponding image data is read from the customer-use terminal device 1 so as to be transmitted to the automatic printer 7. At this time, the information of the required number of photos developed from the image data is also sent to the automatic printer 7. Then the automatic printer 7 starts the processes of printing, developing and drying, in accordance with the received image data and the information of the number of photos.

In the meantime, with a normal blank CD-R disc, the customer moves to the customer-use terminal device 1 where the customer placed the order, and inputs the instruction of carrying out the CD-R writing process. Then after the message suggesting the setting of the CD-R disc is displayed on the display screen, the customer inserts the CD-R disc into the CD-R drive 3 (S31). Then the CD-R disc which has been set is read out (S32), so that whether or not the CD-R disc is writable is checked.

When it is confirmed that the CD-R disc is writable, the customer inputs the order number to the customer-use terminal device 1, so as to specify the order of his/her own from the data stored in the data storing section 9. The customer-use terminal device 1 checks whether or not the specified order information includes the data indicating the completion of the payment (S33), and after the confirmation of the completion of the payment, the CD-R writing process starts (S34).

According to the steps above, a normal blank CD-R disc which is commercially available can be adopted to the CD-R writing process. In other words, customers may bring in a blank CD-R disc, or may purchase a blank CD-R disc from the shop.

Moreover, as described above, it is unnecessary for the shop to store the security information in the CD-R discs so that the shop can significantly save labor. Furthermore, since the check of the payment is carried out by the data transfer carried out by the shop, the security level is considerably improved.

Figure 4:
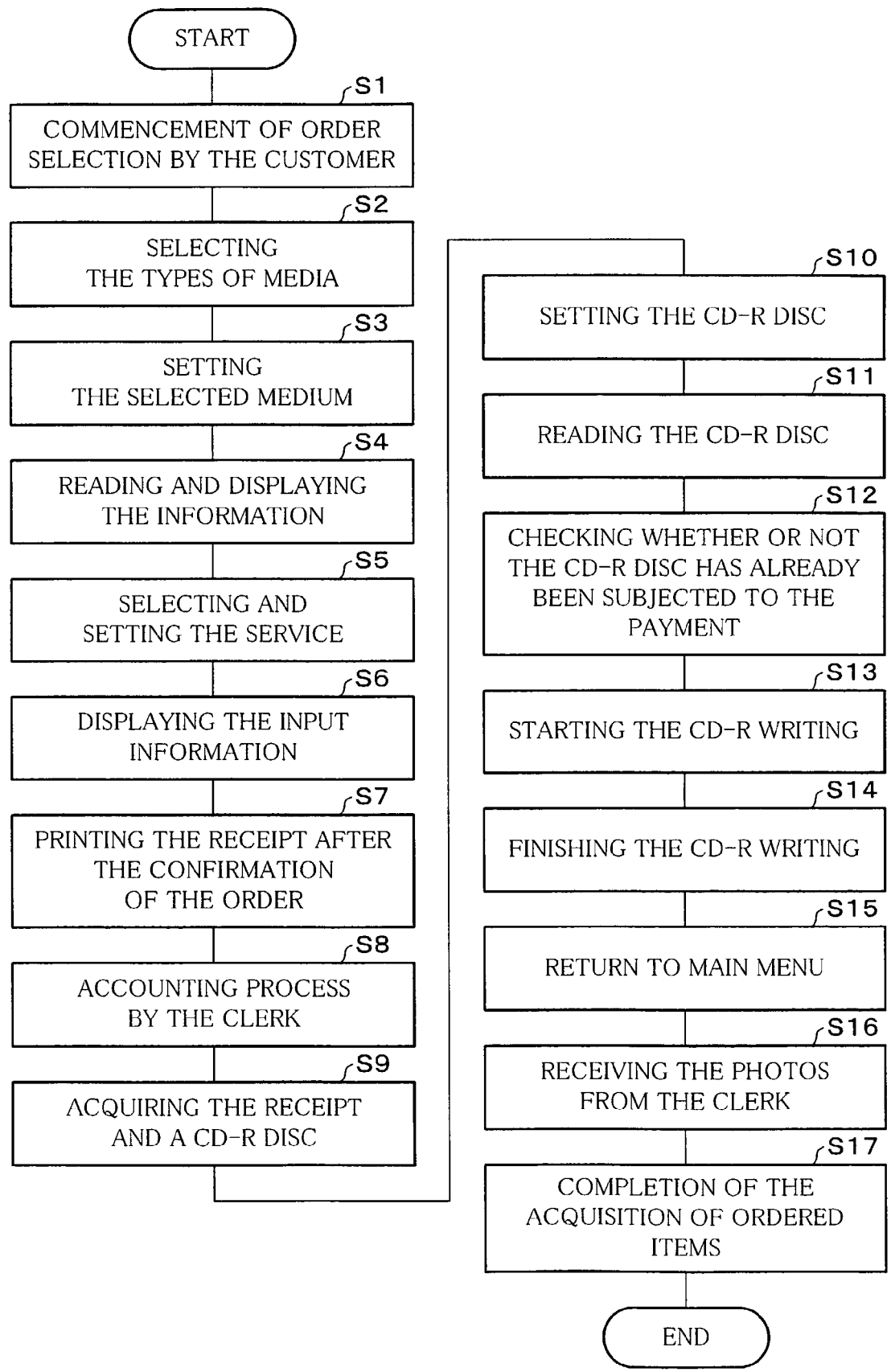
FIG. 4 is a flow chart, showing an example of a flow of steps in the photo service system.
Figure 5:
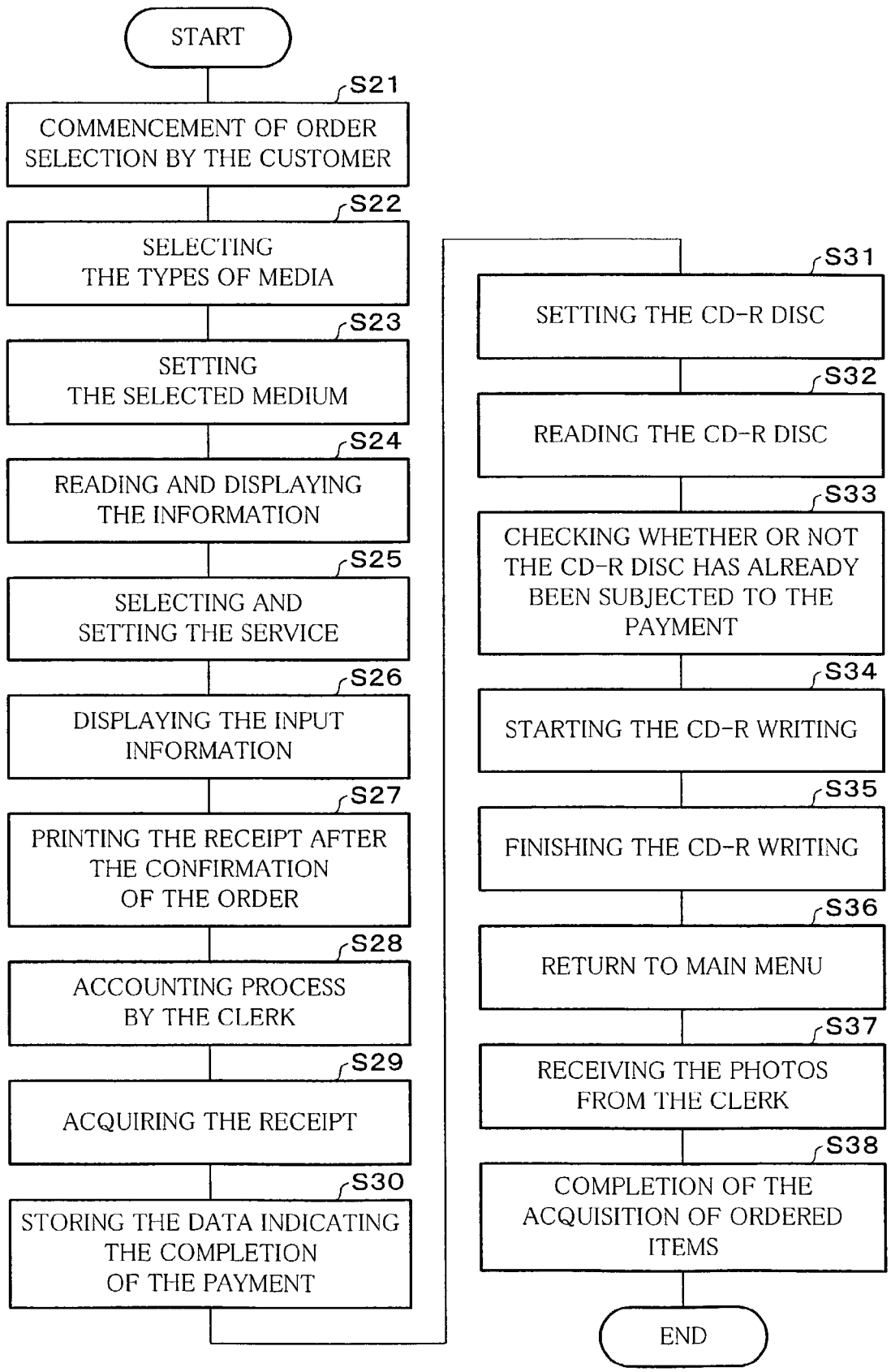
FIG. 5 is a flow chart, showing an example of another flow of steps in the photo service system.

Incidentally, the examples of the steps illustrated in FIGS. 4 and 5 are arranged so that, after the completion of the payment, the customer inputs the order number to the customer-use terminal device 1 so that the CD-R writing process is carried out. However, the present invention is not limited to this arrangement. For instance, the present invention may be arranged such that after the completion of inputting the order to the customer-use terminal device 1, the customer-use terminal device 1 waits for the production of the CD-R disc in accordance with the order, and the CD-R writing process corresponding to the order starts after the confirmation of the completion of the payment.

Also, the steps illustrated in FIGS. 4 and 5 may be arranged such that, when inputting the order, the customer is asked to input an ID code such as a telephone number for specifying the customer, and the ID code is required when carrying out the CD-R writing process. On this account, it is possible to confirm that the customer who placed the order is identical with the customer who instructs the CD-R writing process.

Moreover, although the examples of the steps illustrated in FIGS. 4 and 5 are arranged so that, after the completion of the payment, the customer returns to the customer-use terminal device 1 where he/she placed the order and instructs the start of the CD-R writing process, the present invention may be arranged such that the start of the CD-R writing process is instructed from a customer-use terminal device 1 which is different from the customer-use terminal device 1 where the customer placed the order. In this case, first of all, the customer who has completed the payment inputs the order number to an arbitrary customer-use terminal device 1. The inputted information is sent to the clerk-use terminal device 6. Then the corresponding data and specifications of the order which are stored in the customer-use terminal device 6 is supplied to the customer-use terminal device 1, so that the CD-R writing process is carried out in accordance with the supplied information.

According to this arrangement, the CD-R writing process is not necessarily carried out in the customer-use terminal device 1 where the customer placed the order, so that, when the customer-use terminal device 1 where the customer placed the order is used by another customer, the customer who placed the order can use another customer-use terminal device 1. On this account, it is possible to construct a system with high usability for the customers.

Incidentally, although this example is arranged so that the data and specifications of the order is acquired from the clerk-use terminal device 6 by inputting the order number to an arbitrary customer-use terminal device 1, the data and specifications of the order can be directly acquired from the customer-use terminal device 1 where the customer placed the order, and this enables to reduce the workload of the clerk-use terminal device 6.

Also, as in the arrangement above, when inputting the ID for identifying customers is required at the time of inputting the order and at the time of instructing the start of the CD-R writing process, it is possible to confirm that the customer who placed the order is identical with the customer who instructs the start of the CD-R writing process.

Moreover, in the examples of the steps above, the data and order information acquired at the time of placing the order are stored in the data storing section 9 of the customer-use terminal device 1 from which the order is placed, and the data and order information are also supplied to the clerk-use terminal device 6 via networks so as to be stored in the data storing section 22 of the clerk-use terminal device 6. This arrangement is a safety measure against the loss of data from either one of the terminal devices for some reason, by storing the same data in both of the terminal devices. However, when this kind of trouble rarely happens, for instance, a data server which is added to the network may manage the data in a unified manner. Alternatively, the clerk-use terminal device 6 may serve as the data server.

As described above, according to the photo service system in accordance with the present embodiment, while a clerk of the shop carries out the process of photo printing and the process of payment, a customer him/herself carries out the CD-R writing process by operating the customer-use terminal device 1. Since this arrangement enables the shop to save labor, the labor cost of the shop can be reduced so that the service can be provided at low prices.

Moreover, since the money accounting process is carried out by the clerks, it is unnecessary to attach an accounting device to the customer-use terminal device 1, and hence the customer-use terminal device 1 can be constructed out of a commonly-used personal computer and peripheral equipments thereof. Thus, the customer-use terminal device 1 can be employed with low cost and hence the shop can introduce the photo service system without difficulty.

Incidentally, although the present embodiment is arranged for providing the CD-R writing service, the storing medium is not limited to CD-R discs so that any kinds of storing media may be used as long as the storing medium has a capacity enough to store photo image data. Thus, for instance, CD-RW, DVD-R, DVD-RW, and DVD-RAM discs may be adopted.

Similarly, although the present embodiment describes the service of storing photo image data to a CD-R disc, the arrangement described in the embodiment can be used for the service of storing video data to a storing medium such as a DVD-R disc, a DVD-RW disc, and a DVD-RAM disc.

Moreover, the image data storing service system in accordance with the present invention may be characterized in that, in the aforementioned arrangement, the customer-use terminal device subjects the image data storing device to store the digital image data only when information indicating a completion of the payment is stored in the storing medium which is set in the image data storing device.

According to this arrangement, the storing of the digital image data is only permitted to the storing medium in which the information indicating the completion of the payment is stored. When, for instance, this kind of storing medium is only provided by the shop, the customer-use terminal device can confirm the completion of the payment with certainty.

Furthermore, the customer-use terminal device can check whether or not the payment is done only by checking the content of the storing medium set in the image data storing device, so that it is unnecessary to provide a device such as a device for confirming the completion of the payment. Thus, the customer-use terminal device can be employed with low cost and hence the shop can introduce this kind of system without difficulty.

Moreover, the image data storing service system in accordance with the present invention, which is arranged as above, may be characterized by further including: a clerk-use terminal device which is operated by a clerk; and an image output device which outputs the digital image data as an image, wherein the clerk-use terminal, the customer-use terminal, and the image output device are connected to each other so that data communication between each other can be carried out, and when the payment is completed, the digital image data which is read out by the customer-use terminal device is outputted from the image output device, following an instruction from the clerk-use terminal device.

According to this arrangement, the clerk-use terminal device, the customer-use terminal device, and the image output device are connected to each other so that data communication between each other can be carried out. On this account, when the customer wants to output the digital image data acquired by the customer-use terminal device from the image output device, the customer makes the payment for this service to the clerk so that the digital image data is supplied to the image output device following the instruction from the clerk-use terminal device, and consequently the digital image data is outputted from the image output device. In other words, this system makes it possible to carry out the service of outputting images as well as the service of storing digital image data.

Moreover, since the outputting from the image output device is carried out in response to the instruction from the clerk-use terminal device, images are outputted only after the completion of the payment. Thus, the collection of the payment for the service of outputting images is also ensured. Incidentally, the instruction from the clerk-use terminal device may be automatically sent to the image output device when the confirmation of the payment, or may be manually sent to the image output device by the clerk.

Moreover, the image data storing service system in accordance with the present invention, which is arranged as above, may be characterized by further including a clerk-use terminal device which is operated by a clerk, wherein the clerk-use terminal and the customer-use terminal are connected to each other so that data communication between each other can be carried out, and when the payment is completed, the digital image data which is read out by the customer-use terminal device is outputted from the image output device, following an instruction from the clerk-use terminal device.

According to this arrangement, when the payment is completed, the clerk manually informs the completion of the payment to the clerk-use terminal device, and this information is supplied to the customer-use terminal device so that the completion of the payment is confirmed in the customer-use terminal device. On this account, the customer-use terminal device can certainly confirm the completion of the payment.

Also, since this system can be realized using a commonly-used communication network such as LAN, the construction of the system is relatively easy. Thus the required introduction cost is low and the system can be employed relatively easily.

Furthermore, the image data storing service system in accordance with the present invention, which is arranged as above, may be characterized by further including an image output device which outputs the digital image data as an image, wherein the clerk-use terminal, the customer-use terminal, and the image output device are connected to each other so that data communication between each other can be carried out, and when the payment is completed, the clerk-use terminal device instructs the image output device to output the digital image data which is read out by the customer-use terminal device.

According to this arrangement, the clerk-use terminal device, the customer-use terminal device, and the image output device are connected to each other so that data communication between each other can be carried out. On this account, when the customer wants to output the digital image data acquired by the customer-use terminal device from the image output device, the customer makes the payment for this service to the clerk so that the clerk sends the digital image data to the image output device by inputting instruction from the clerk-use terminal device, and consequently the digital image data is outputted from the image output device. In other words, this system makes it possible to carry out the service of outputting images as well as the service of storing digital image data.

Moreover, since the outputting from the image output device is carried out in response to the instruction from the clerk-use terminal device, images are outputted only when the payment is completed. Thus, the collection of the payment for the service of outputting images is also ensured. Incidentally, the instruction from the clerk-use terminal device may be automatically sent to the image output device when the payment is confirmed, or may be manually sent to the image output device by the clerk.

Furthermore, the image data storing service system in accordance with the present invention may be characterized in that, in the aforementioned arrangement, a plurality of customer-use terminal devices are provided.

According to this arrangement, since a plurality of customer-use terminal device are provided in the system, a plurality of customers can carry out the processes such as reading image information and storing digital image data at the same time. This enables the system to deal with more customers, and hence sales of the shop are expected to increase.

Also, even if a plurality of customers simultaneously carry out the processes above, the clerks only carry out the money accounting process so that the workload of the clerks is relatively light. On this account, it is possible to increase the sales without increasing the labor costs.

Moreover, the image data storing service system in accordance with the present invention may be characterized in that, in the arrangement above, the plurality of the customer-use terminal devices are arranged so that data communication between each other can be carried out, and when the customer-use terminal device, in which the image information reading device reads out the image information, is different from the customer-use terminal device in which the image data storing device stores the digital image, from the customer-use terminal device by which the image information is read out, a set of digital image data corresponding to the image information which has been read out is supplied to the customer-use terminal device by which the digital image data is to be stored.

According to this arrangement, even if the customer-use terminal device, in which the image information reading device reads out the image information, is different from the customer-use terminal device in which the digital image data is to be stored in the image data storing device, it is possible to carry out the storing of the digital image data. Thus, on occasion when a customer has finished to carry out the reading of image information and the payment for the service to the clerk, if the customer-use terminal service from which the reading of the image information was instructed is used by another customer, the customer can carry out the storing of the digital image data using a different customer-use terminal device. This arrangement improves not only the user-friendliness of the system but also the capacity of the system to deal with the customers.

Furthermore, the image data storing system in accordance with the present invention may be characterized in that, in the aforementioned arrangement, in the image information reading device, the data carrier from which the image information is read out is a storing medium in which the digital image data is stored and/or a data career in which the digital image data is stored as an image.

This arrangement makes it possible for the customer to bring in (i) a storing medium in which digital image data is stored, such as a flash memory in which images taken by a digital camera is stored, a floppy disc, an MO disc, and a ZIP disc, or (ii) a data carrier storing images, such as a photo and a negative, to the shop, and store the images, which are stored in these media, in a predetermined storing medium as digital image data. Thus, the customer can make a backup copy of the image data stored in, for instance, a flash memory, so that the customer can erase the data stored in the flash memory and store newly-taken image data in the flash memory. Also, when a photo or a negative is read out, it is possible to convert the images on the photo or the negative to digital image data, and hence this makes it possible to deal with the image data using apparatuses such as a personal computer.

Moreover, the image data storing service system in accordance with the present invention may be characterized in that, in the aforementioned arrangement, in the image data storing device, the storing medium in which the digital image data is stored is a CD-R disc.

According to this arrangement, since a storing medium in which digital image data is stored is a CD-R disc which is relatively cheap and can store a relatively large amount of data, a sufficient amount of image data can be stored therein and the service of storing image data can be provided at low cost. Also, since CD-R discs can be read by a well-diffused normal CD-ROM drive, high demand for the service is expected so that shops employing this service would increase the sales.

The invention being thus described, it will be obvious that the same may be varied in many ways. Such variations are not to be regarded as a departure from the spirit and scope of the invention, and all such modifications as would be obvious to one skilled in the art intended to be included within the scope of the following claims.

What is claimed is:

1. An image data storing service system used in a shop providing a service of storing image information, which is stored in a data carrier brought by a customer, in a predetermined type of a removable storing medium as digital image data, comprising:
    a customer-use terminal device which is operated by a customer;
    an image information reading device connected to the customer-use terminal device, adapted for reading out the image information stored in the data carrier brought by the customer;
    the removable storing medium for storing image data; and
    an image data storing device connected to the customer-use terminal device, adapted for storing in the removable storing medium, digital image data obtained from the image information as read by said image information reading device; wherein
    the removable storing medium for storing image data records a serial code which contains a serial number provided consecutively in order of which said removable storing medium is provided to the customer,
    the customer-use terminal device checks, at the beginning of a business day, a serial number of the storing medium which is to be firstly provided to the customer, and a range of serial numbers of storing media that may be provided in the business day is set from the serial number thus checked and
    the customer-use terminal device which is operated by the customer:
    (a) controls said image information reading device to read out the image information; and
    (b) when said removable storing medium is set in said image data storing device by the customer, the customer-use terminal device (i) confirms if receipt data, which proves that a payment has been completed by the customer, is recorded in the removable storing medium, said receipt data having been recorded in said removable storing medium before said removable storing medium is set in the image data storing device and said receipt data being an encrypted serial code which is inherent in said removable storing medium, and (ii) determines, in a case where said encrypted serial code which is inherent in said removable storing medium is recorded in said removable storing medium, if the serial number contained in said serial code is in the range of the serial numbers thus set: and when it is confirmed that said serial number is in the range of the serial numbers thus set, controls the image data storing device to execute the process of storing the digital image data in the removable storing medium as set.

2. The image data storing service system as defined in claim 1, wherein a plurality of customer-use terminal devices are provided.

3. The image data storing service system as defined in claim 1, wherein, in the image information reading device, the data carrier from which the image information is read out is a storing medium in which the digital image data is stored or a data carrier in which the digital image data is stored as an image.

4. The image data storing service system as defined in claim 1, wherein, in the image data storing device, the storing medium in which the digital image data is stored is a CD-R disc.

5. The image data storing service system as defined in claim 2, wherein the plurality of the customer-use terminal devices are arranged so that data communication between each other can be carried out, a customer-use terminal device in which the image information reading device reads out the image information, receives order information from the customer, the order information being a request for a desired service with respect to the image information, and when the customer-use terminal device, in which the image information reading device reads out the image information, is different from the customer-use terminal device in which the image data storing device stores the digital image, upon entering of an order number indicative of the order information by the customer to the customer-use terminal device in which the image data storing device stores the digital image, from the customer-use terminal device by which the image information is read out, a set of digital image data corresponding to the image information which has been read out is supplied to the customer-use terminal device by which the digital image data is to be stored.

* * * * *